Jan. 16, 1962 R. W. CRUGER 3,017,144
DEVICE FOR ARRESTING THE MOVEMENT OF LANDING
AIRCRAFT OR THE LIKE
Filed March 29, 1957 4 Sheets-Sheet 1
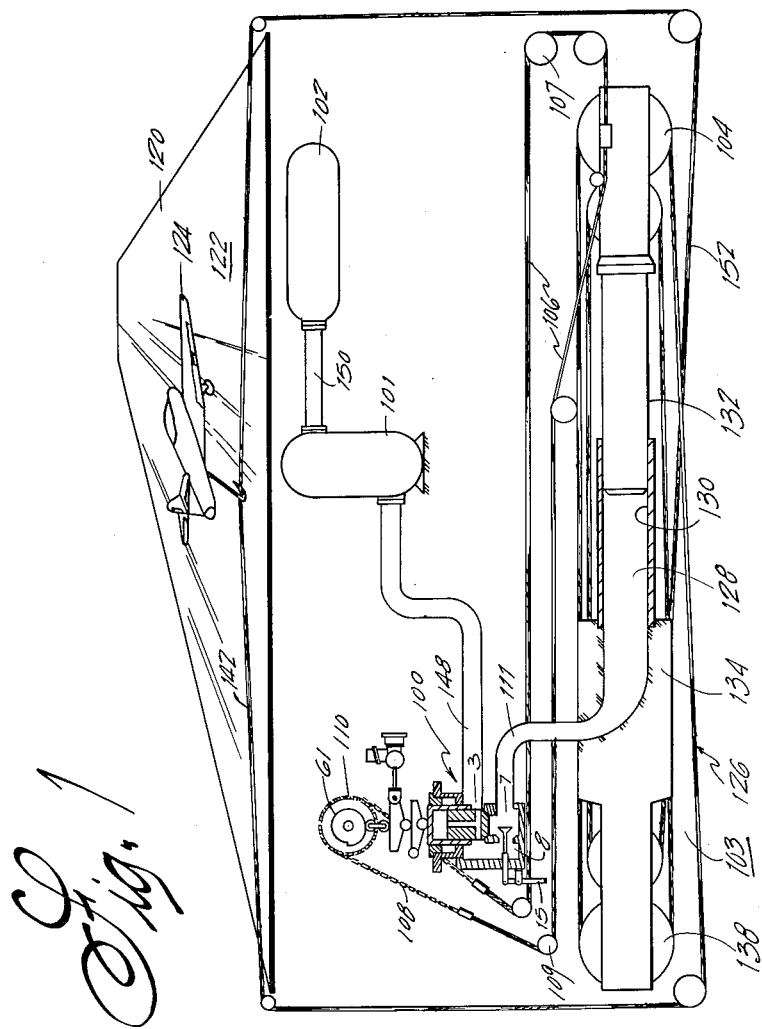
INVENTOR.
ROBERT W. CRUGER
BY
Arthur L. Rollins
ATTORNEY Jan. 16, 1962 R. W. CRUGER 3,017,144
DEVICE FOR ARRESTING THE MOVEMENT OF LANDING
AIRCRAFT OR THE LIKE
Filed March 29, 1957 4 Sheets-Sheet 2
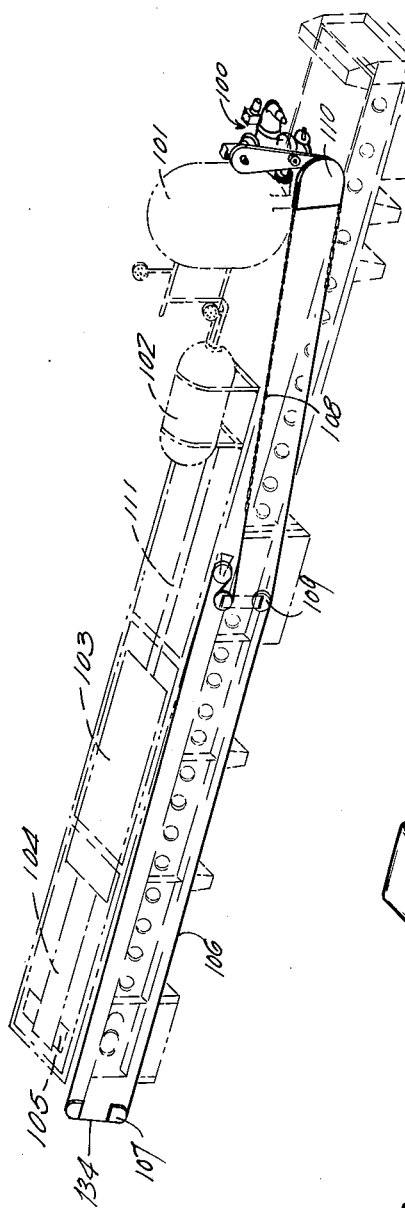
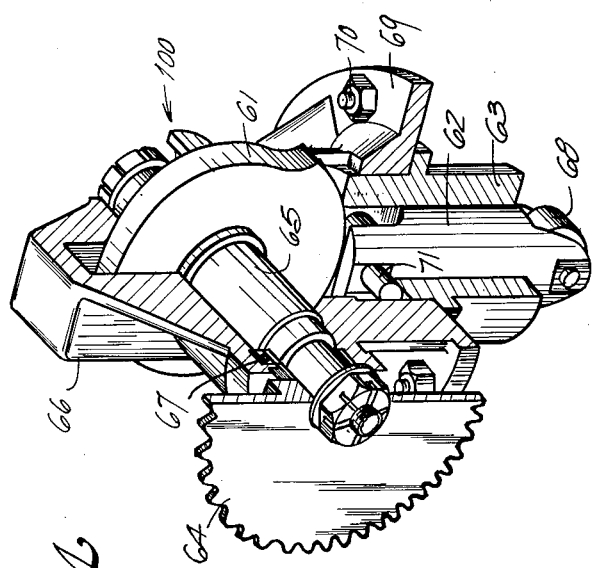
INVENTOR.
ROBERT W. CRUGER
BY
ATTORNEYS

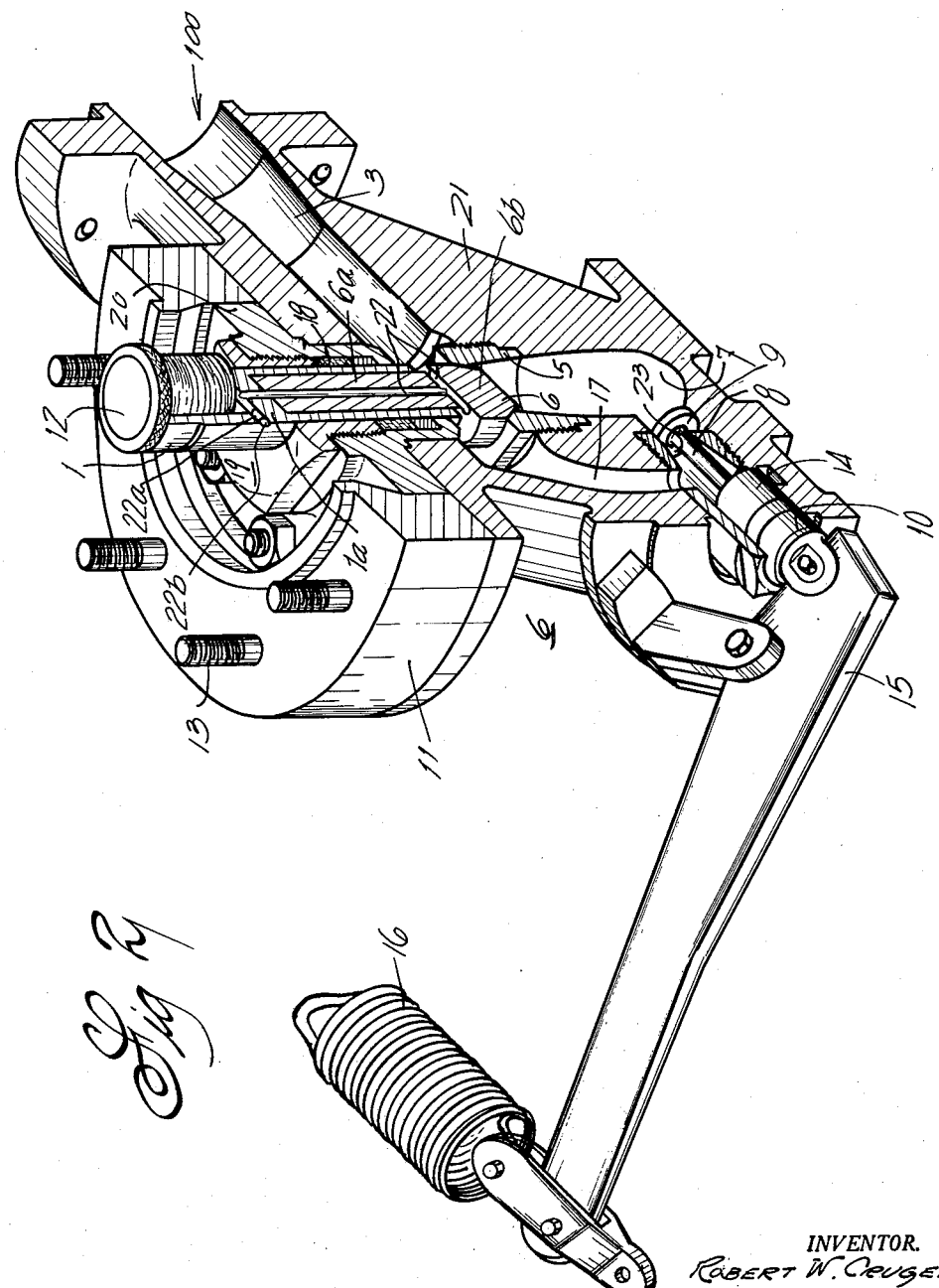

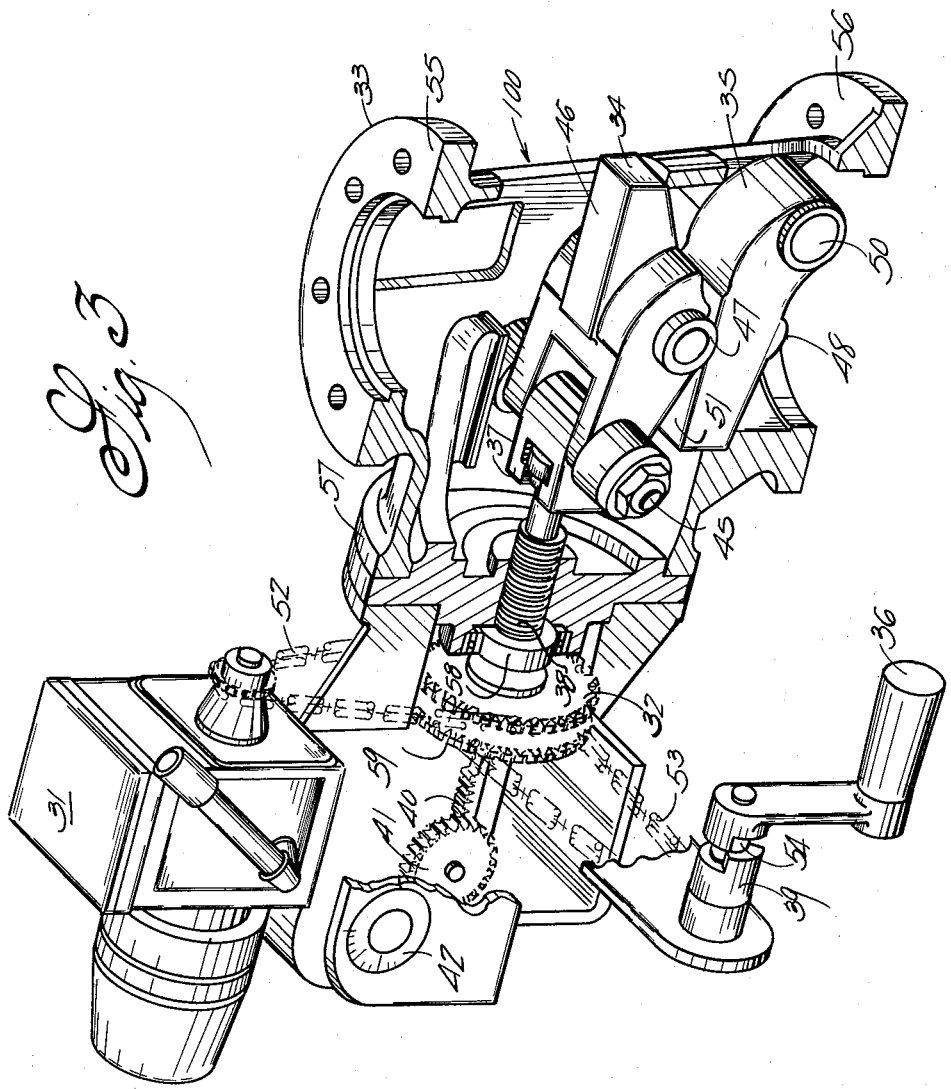

United States Patent Office 3,017,144
Patented Jan. 16, 1962

3,017,144
DEVICE FOR ARRESTING THE MOVEMENT OF LANDING AIRCRAFT OR THE LIKE
Robert W. Cruger, 70 Drexelbrook Drive, Drexel Hill, Pa.
Filed Mar. 29, 1957, Ser. No. 649,584
5 Claims. (Cl. 244—110)
(Granted under Title 35, U.S. Code (1952), sec. 266)

The invention described herein may be manufactured and used by or for the Government of the United States of America for governmental purposes without the payment of any royalties thereon or therefor.

This invention relates to arresting devices and more particularly to an arresting device of the hydraulic type for arresting the movement of an aircraft when landing on the flight deck of an aircraft carrier or the like.

One object of the present invention is to provide an arresting device capable of stopping all landing aircraft at approximately the same position on a carrier flight deck irrespective of the weight and landing speed of the aircraft.

Another object of the invention is to provide an arresting device for arresting the movement of all landing aircraft on a carrier flight deck within the same distance or runout irrespective of the weight and landing speed of the aircraft.

Another object of the invention is to increase the length of the working or service stroke of the piston in an arresting engine.

Another object of the invention is to provide an arresting device including a control valve means for arresting the movement of an aircraft or the like wherein the lift of the valve member in the control valve means may be selectively varied in order to arrest the movement of aircraft of different weights and different landing speeds within the same distance.

These and other objects will be readily apparent to those familiar in the art with reference to the following description and attached drawings wherein:

FIG. 1 shows a portion of an aircraft carrier employing the invention, which is shown schematically, FIG. 1A is a diagrammatic sketch of the control system including the instant control valve, FIG. 2 is a perspective view of the lower portion of control valve and includes the valve unit itself, FIG. 3 is a perspective view of the central portion of the control valve and includes the leverage mechanism, and FIG. 4 is a perspective view of the upper portion of the control valve and includes the cam mechanism.

Referring more particularly to FIG. 1, there is shown a portion of a vessel or ship 120 of the aircraft-carrier-type including a flight deck 122 to accommodate the landing and launching of aircraft or the like 124 and an arresting device generally designated by the reference numeral 126 for arresting the movement of an aircraft when landing on the flight deck 122. The arresting device 126 is comprised of an arresting engine 103 which includes a cylinder or cylinder means 128 having a bore 130 therein in which is slideably received a working piston or piston means 132 of the ram-type. Cylinder 128 is rigidly connected or attached to a frame or support means 134 which in turn is rigidly connected or anchored to a lower deck (not shown) the cylinder 128 and piston 132 thus being located a predetermined distance below flight deck 122.

Means is provided to establish a driving connection between the working piston 132 and a landing aircraft on the carrier deck 122 and herein takes the form of a sheave and cable arrangement. A fixed sheave means or sheave assembly 138 is operatively connected to cylinder 128 at one end thereof, and a moveable sheave means or sheave assembly 104 is carried by the working piston 132, the moveable sheave means 104 thus comprising an engine crosshead. The crosshead 104 is connected to the end of piston 132 remote from cylinder 128 and is thus movable with piston 132 in its movement in cylinder bore 130. A cable or cable means 152 is carried by the sheave means 138 and 104 and is adapted to extend to the flight deck 122 wherein it is connected or attached to a deck pendant 142. A cable 106 is strung around a series of pulleys 107 and 109 carried by the frame means 134 and is maintained in a tensioned condition by any suitable means (not shown). Cable 106 is also strung around a number of other pulleys for its proper guidance and its ends are secured to the crosshead.

Cable means 106 includes a chain portion 108 which is adapted to provide a chain drive for a valve means or control valve associated with the arresting engine 103, the control valve being generally designated by the reference numeral 100. The chain portion 108 cooperates with or meshes with a rotatable sprocket member 110 associated with the control valve 100 and movement of the chain portion 108 is accompanied by a corresponding rotation of the sprocket member 110. Movement of the sprocket member 110 in turn produces a movement of a cam associated with the control valve 100 which cam controls the movement of a valve member, the structure and function of the control valve 100 together with the components associated therewith to be discussed more in detail hereinafter.

The arresting engine 103 also includes an accumulator or accumulator means 101 for supplying the cylinder 128 with a source of fluid under pressure, preferably a hydraulic fluid of some suitable type. The accumulator 101 is connected to the control valve 100 by a conduit 148, and another conduit or hydraulic line 111 establishes a connection between the bore 130 of cylinder 128 and the control valve. A source of compressed air or flask means 102 is connected to the accumulator 101 by a conduit or line 150.

Referring to FIGURE 2, the lower section of the arresting control valve comprises an upper annular spacer 11 and a lower housing member 21. Projecting upward from the spacer are a plurality of lugs 13 for engagement with the lower portion of the weight selector (FIGURE 3). Located in the recess portion of the spacer 11 is a two-stepped ring 20 having a central bore therein and the smaller diametered step of the ring extends through a complementary bore in housing 21. Slideably centered in the bore of ring 20 is the valve sleeve 1 which extends at the upper end past the extremity of the ring 20. Packing nut 19 and chevron packing 18 provide seal means between the valve sleeve 1 and ring 20. The valve sleeve 1 is made tubular at each end, with one of the ends being capped by a threaded cover 12; the opposite tubular end receives the stem or valve member portion 6 of arresting control valve 100. The head on the valve member 6 mates with the valve seat 5 to control the flow of fluid from a cylinder chamber 7 in the control valve housing 21 to an accumulator chamber 3 and passage 17 therein. Chamber 7 is directly connected to arresting cylinder 103 via conduit 111 (FIGURE 1), while accumulator chamber 3 is directly connected to the accumulator 101 by conduit 148. Drilled channels 22 extending transversely and longitudinally of the valve stem 6 lead from the accumulator chamber 3 to the top of the valve stem. The body portion of the valve sleeve 1 is likewise provided with drilled channels 22a extending longitudinally and transversely thereof with the longitudinally extending channel 22a in the valve sleeve 1 being positioned to register with the longitudinally extending passage 22 in the stem 6.

To one side of cylinder chamber 7 is located a side port 23 containing a retracting valve housing 9 and a slideable retracting valve 8 therein. The valve face complements the seat situated on the housing thus cutting off communication between the cylinder chamber 7 and the conduit 17. The valve stem is joined to a cylindrical plunger having sections 10, 14 separated by a standard O ring seal. The face area of the plunger is greater than the face area of the valve face so that there is a constant tendency to maintain the face and seat of the retracting valve in the mated or closed position.

Connected to one end of the plunger and retracting valve is a manual lever 15 fulcrumed to the housing 21 and biased to a valve-closed position by a spring 16.

Referring to FIGURE 3, the airplane weight selector section of the valve consists of a T shaped stanchion 33 having flanges 55, 56 and 57 at each end of the T. The lower flange 56 mates with the spacer 11 portion of FIGURE 2 with bolts 13 entering complementary ports in such flange.

A fixed lever 35 is pivoted at 50 to the stanchion 33; on the underside of the lever a metal pad 48 bears against the screw section 12 of the sleeve 1 (FIGURE 2). The top of the lever has a flat bearing surface 51 for engagement with the second lever 34. The latter lever has a projecting contact surface 47 for engagement with the flat surface 51 of lever 35. On the topmost side of the lever 34, a flat surface 46 projects outward for engagement with the cam roller 68 to be described later (FIGURE 4).

The forward end of adjustable lever 34 is yoked with the yoke receiving block 37 and pivoted thereto as at 45 by conventional spacers, nuts etc. Lead screw 38 is secured to the block 37 and is supported by nut 58 set in ball bearings. A sprocket 32 is similarly threaded on screw 38 and has a chain 52 engaging the periphery of the sprocket wheel 32 imparting rotary motion from a motor unit 31. The latter unit is equipped with a conventional clutch to engage or disengage the motor unit from the drive system.

A second sprocket wheel 59 is threaded on screw 38 and has a chain drive 53 leading from a hand crank 36. A conventional clutch has jaws 39, 54 for positive engagement of the crank with the drive system.

Extending from the free end of the lead screw 38 is a rack 40 having its teeth rotating a plurality of change gears 41. The latter gears are connected to the local indicator 42, thereby giving a visual indication of the position of the leverage system 34, 35. For ease in setting, the indicator may be calibrated in pounds.

Referring to FIGURE 4, the cam and plunger assembly consists of a housing 66 having a lower flange 69 attached thereto. The latter flange mates with the flange 55 of the stanchion 33 and the two flanges are secured to each other by fastening means 70.

Mounted within the housing is a rotating cam 61 secured to shaft 65, the latter being housed in bearings 67 in the housing. Secured to one end of the shaft is a sprocket wheel 64 rotated by the chain 108 (FIGURE 1) actuated by the crosshead mechanism. The cam 61 therefore rotates in a predetermined relation with the linear travel of the crosshead.

A plunger 62 is located between the cam 61 and the adjustable lever 34 (FIGURE 3); the cam plunger is guided in its travel by a plunger guide 63 secured to the underside of the housing 66. Rotatably mounted on one end of the plunger is a cam roller 68 which bears against the flat bearing surface 46 of lever 34 (FIGURE 3); lug 71 projecting from the side of plunger 62 cooperates with an end surface of guide 63 to act as a limit means for the downward travel of the plunger and roller means.

With relation to the lever system (FIGURE 3), the lever arm ratio of each lever is variable between 1:1 and 2:1. In the particular design used, the distances from the pivot point to the roller or pad and to the lever extremity of each were made equal; however, the distances may be altered to obtain different ratios for different design purposes. For a better understanding of the lever system, it should be thought of in terms of a distance divider rather than a force multiplier. Thus the system is variable from a ratio of 1:1 to 4:1. For example, if roller 68, roller 47 and pad 48 are in line, downward movement of the cam plunger and roller, say 1″, will produce a downward movement of 1″ at pad 48. At the other extreme, with a ratio of 4:1, movement of roller 68 of 1″ will produce a movement at roller 47 of cam 34 of ½″ and a corresponding movement at pad 48 of ¼″.

*Operation*

In commencing the operation of an arrestment, the weight of the particular airplane to be arrested must be known. The weight of the airplane is set into the lever system either through (*a*) the hand crank 36, or (*b*) through motor unit 31 which can be remotely controlled if desired. In either case, rotation of either sprocket wheel 32 or 59 causes linear travel of the lever system via lead screw 38. At the same time gears 41 are actuated through rack 40 to denote on the local indicator 42 the weight set.

In making this adjustment, pressure fluid from the accumulator chamber 3, in addition to assisting in seating valve stem 6, also enters ports 22 and separates sleeve 1 from valve stem 6 providing a fluid cushion for the valve stem. Fluid also enters passage 17 creating a differential pressure on the retracting valve 8 such that the valve 8 is maintained in its closed position. The hook-up is now in "Battery" or the "Battery" position ready for arrestment.

Referring to FIGURE 1, the airplane's landing hook picks up the deck pendant 142 causing travel of the piston 132 of the engine crosshead 104 into the cylinder 128 of the hydraulic arresting engine 103. Pressure fluid is displaced into line 111 and chamber 7 thereby opening valve member 6 against the accumulator pressure on the reverse side of the valve member. The rise of the valve member 6 is cushioned by the fluid at accumulator pressure between the sleeve 1 and valve member.

Upon further movement of the crosshead, cable 106 is rotated thereby actuating chain 108 which in turn rotates sprocket wheel 64 (FIGURE 4). Cam 61 is rotated by this sprocket wheel effecting a gradual closing of the valve member 6; the resistance of the valve member to flow fluid from the cylinder chamber 7 to the accumulator chamber 3 is thereby gradually increased and the energy of the airplane is dissipated in forcing fluid through the restricted valve opening.

At the end of a predetermined crosshead travel, the cam has rotated through its work cycle and has moved the valve member 6 into contact with the valve seat 5; the flow of fluid is cut off and the plane is brought to a positive stop.

To retract the arresting unit to "Battery," lever 15 is actuated to open retracting valve 8. The fluid, at accumulator pressure increased by cylinder pressure during arrestment, forces the fluid in line 111 back into the cylinder 128 of arresting engine 103 reversing the movement of the piston 132 and crosshead 104. Cables 106 are simultaneously reversibly rotated thereby rotating the cam 61 to its original position with pressure fluid in the accumulator 101 causing the sleeve 1 to maintain contact with the lever system and the latter system to maintain contact with roller 68. When the crosshead 104 is fully retracted, the sleeve 1 and cam 61 have returned to their original positions; valve 8 is closed and the arresting unit is at "Battery."

It is noted that the control valve 100 is of the "constant runout" type. Thus, the initial positioning of the lever system determines the degree of opening of the valve member 6 of the arresting valve. Adjustment of the setting determines the position of the valve sleeve 1 which controls the degree of opening of the valve member. The degree of opening controls the rate of closure as the action of the cam upon the sleeve is always the same. A predetermined amount of crosshead travel corresponds to a predetermined degree of cam rotation so that the valve member is closed always at the same point. Correspondingly, the airplane is always finally arrested at the same point.

In addition, upon the termination of an arresting stroke the valve member is in its seated position. The levers are so mounted and adjusted that a change in ratio does not affect the valve sleeve when the valve member is so seated. Because of this, the point of closing the valve is independent of the airplane weight selector. It is a function of the cam only, and therefore it is constant.

Obviously many modifications and variations of the present invention are possible in the light of the above teachings. It is therefore to be understood that within the scope of the appended claims the invention may be practiced otherwise than as specifically described.

What is claimed is:

1. A device for arresting the movement of an aircraft or the like in a predetermined distance when landing on the flight deck on an aircraft carrier or the like, comprising an arresting engine including cylinder means, piston means slideably received within said cylinder means, sheave means associated with said cylinder means and fixed against movement relative thereto, sheave means operatively connected to said piston means and providing an engine crosshead movable with said piston means, cable means associated with said first and second mentioned sheave means, pendant means operatively connected to said cable means and being carried on said flight deck of said aircraft carrier, said pendant means being engageable by said aircraft landing on said carrier flight deck and thereby being operable to transmit the force of said landing aircraft to said cable means, accumulator means operatively connected to said engine cylinder means and being operable to supply said engine cylinder means with fluid under pressure, flask means operatively connected to said accumulator means for supplying said accumulator means with fluid under pressure, valve means operatively connected to said accumulator means and said engine cylinder means and including a valve member movable between open and closed positions relative to a valve seat for controlling the flow of pressurized fluid between said accumulator means and said engine cylinder means, said valve member normally blocking fluid flow from said accumulator to said cylinder and adapted to open under increased pressure therein, lever means associated with said valve means for selectively varying the lift of said valve member when said valve member is moved to said open position, cam means associated with said lever means and being operable upon rotation through a predetermined range of movement to move said valve member to said closed position, means for pre-setting said lever means at a predetermined position and means including said cable means operatively connecting said engine crosshead and said cam means whereby a predetermined movemen of said engine piston means and crosshead in response to a predetermined load being applied to said piston means and cross head by a landing aircraft engaging said deck pendant is accompanied by a corresponding predetermined rotation of said cam means and a predetermined movement of said valve member to said closed position.

2. A device as claimed in claim 1 wherein said last named means includes chain means operatively connected to said cable means and sprocket means operatively connected to said cam means, said sprocket means being driven by said chain means.

3. A device as claimed in claim 1 wherein said engine cylinder means is comprised of a single cylinder and said piston means is comprised of a single ram-type piston.

4. A device as claimed in claim 1 further including a retraction valve means associated with said first mentioned valve means for effecting the reverse flow of fluid between said accumulator means and cylinder means to thereby move said piston means, said crosshead and said cam means to the positions initially occupied by same prior to the arrestment of said aircraft.

5. A device as claimed in claim 4 wherein said retraction valve means is directly connected to said first mentioned valve means.

References Cited in the file of this patent

UNITED STATES PATENTS

| | | |
|---|---|---|
| 1,812,533 | Hunt | June 30, 1931 |
| 1,869,604 | McWhirter | Aug. 2, 1932 |
| 2,444,228 | Huthsing | June 29, 1948 |
| 2,521,166 | Hinrichs | Sept. 5, 1950 |
| 2,587,421 | Willach | Feb. 26, 1952 |
| 2,692,029 | Love | Oct. 19, 1954 |
| 2,693,708 | Baer et al. | Nov. 9, 1954 |
| 2,731,219 | Cotton et al. | Jan. 11, 1956 |
| 2,777,653 | Cotton et al. | Jan. 15, 1957 |
| 2,783,004 | Fieux | Feb. 26, 1957 |
| 2,843,228 | Wysor | July 15, 1958 |

FOREIGN PATENTS

| | | |
|---|---|---|
| 663,710 | Great Britain | Dec. 27, 1951 |